United States Patent
Akers et al.

(10) Patent No.: US 6,954,718 B2
(45) Date of Patent: Oct. 11, 2005

(54) METHOD AND APPARATUS FOR COMPARING ACTUAL USE DATA WITH CONTRACT DATA

(75) Inventors: Robyn M. Akers, Torrance, CA (US); Joseph S. Ng, Montebello, CA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 10/215,618

(22) Filed: Aug. 9, 2002

(65) Prior Publication Data

US 2003/0204375 A1 Oct. 30, 2003

Related U.S. Application Data

(60) Provisional application No. 60/376,245, filed on Apr. 29, 2002.

(51) Int. Cl.$^7$ ............................ G06F 11/00; G06F 15/00
(52) U.S. Cl. ........................ 702/188; 702/182; 340/3.1; 725/105
(58) Field of Search ................................ 702/182–185, 702/187, 188; 340/3.43, 3.1; 725/32, 105, 111, 22; 705/7, 8, 14

(56) References Cited

U.S. PATENT DOCUMENTS

| | | | | |
|---|---|---|---|---|
| 3,878,322 A | * | 4/1975 | Sullivan | 725/16 |
| 4,025,851 A | * | 5/1977 | Haselwood et al. | 725/22 |
| 4,547,804 A | * | 10/1985 | Greenberg | 348/460 |
| 5,826,165 A | * | 10/1998 | Echeita et al. | 725/22 |
| 6,389,538 B1 | * | 5/2002 | Gruse et al. | 713/194 |
| 6,424,998 B2 | * | 7/2002 | Hunter | 709/207 |
| 2001/0016834 A1 | * | 8/2001 | Yamanaka et al. | 705/40 |
| 2001/0042249 A1 | * | 11/2001 | Knepper et al. | 725/42 |
| 2002/0032732 A1 | * | 3/2002 | Shigehara | 709/204 |
| 2002/0095679 A1 | * | 7/2002 | Bonini | 725/74 |
| 2002/0129371 A1 | * | 9/2002 | Emura et al. | 725/61 |

* cited by examiner

*Primary Examiner*—Marc S. Hoff
*Assistant Examiner*—Manuel L. Barbee
(74) *Attorney, Agent, or Firm*—Gates & Cooper LLP

(57) ABSTRACT

One or more embodiments of the invention provide a method, apparatus, system, and article of manufacture for monitoring an exhibition system in a digital cinema system. Exhibition information of an exhibitor system in a digital cinema system is obtained. Such exhibition information is automatically generated during a monitoring of projection system equipment. The exhibition information is then summarized. Contractual data (consisting of contractual requirements for the exhibitor system) are also obtained. Comparison information is then produced by comparing the contractual data with the summary.

20 Claims, 4 Drawing Sheets

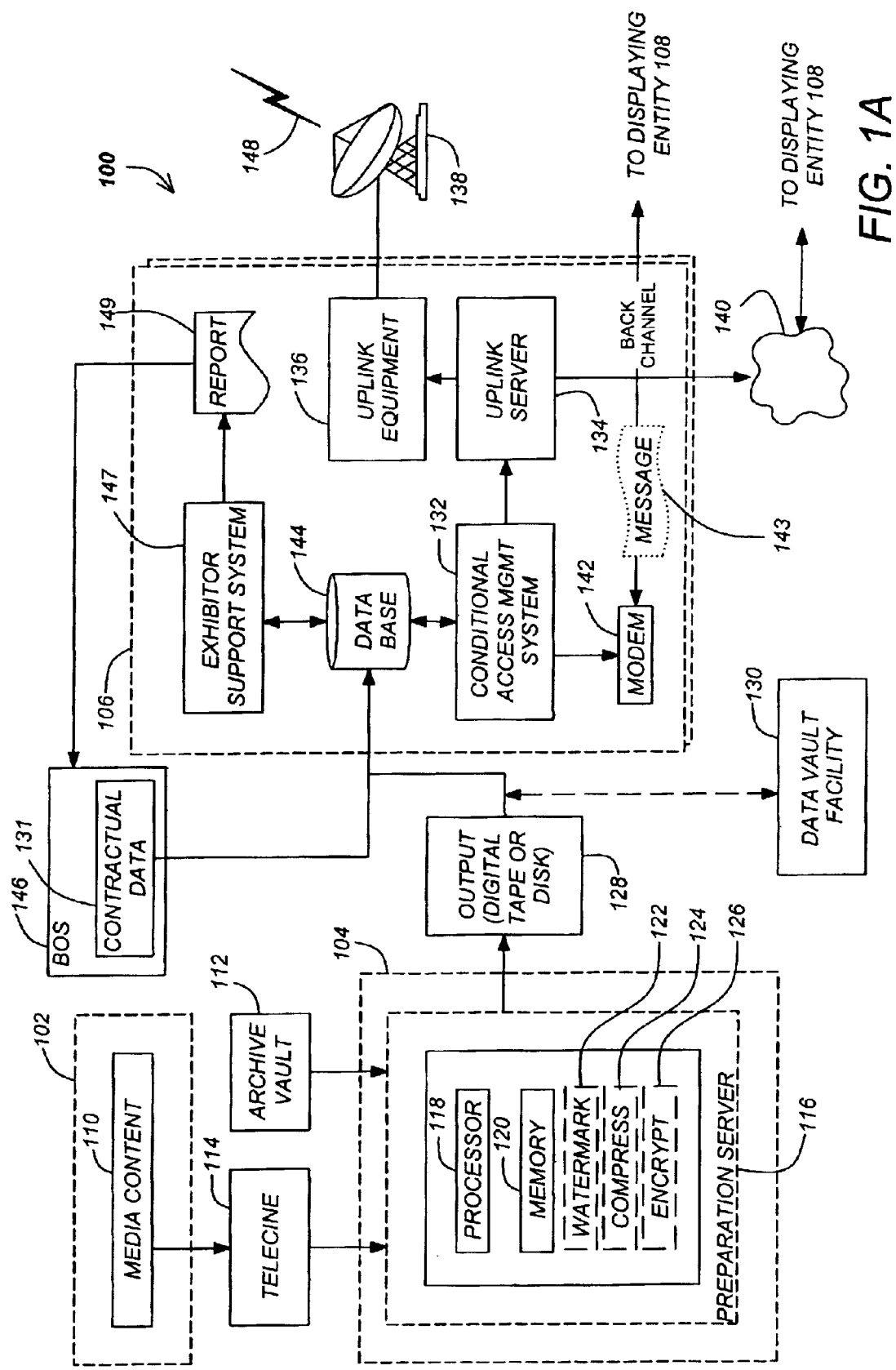

METHOD AND APPARATUS FOR COMPARING ACTUAL USE DATA WITH CONTRACT DATA

CROSS-REFERENCE TO RELATED APPLICATIONS

This application claims the benefit under 35 U.S.C. Section 119(e) of the following co-pending and commonly-assigned U.S. provisional patent application, which is incorporated by reference herein:

Provisional Application Ser. No. 60/376,245, filed Apr. 29, 2002, by Robyn M. Akers and Joseph S. Ng, entitled "A METHOD TO COMPARE ACTUAL USE DATA WITH CONTRACT DATA,".

This application is related to the following co-pending and commonly-assigned patent applications, which applications are incorporated by reference herein:

Provisional Application Ser. No. 60/376,105, filed Apr. 29, 2002, by Charles F. Stirling, Bernard M. Gudaitis, William G. Connelly and Catherine C. Girardey, entitled "SECURE DATA CONTENT DELIVERY SYSTEM FOR MULTIMEDIA APPLICATIONS UTILIZING BANDWIDTH EFFICIENT MODULATION," and Provisional Application Ser. No. 60/376,244, filed Apr. 29, 2002, by Ismael Rodriguez and James C. Campanella, entitled "A METHOD TO SECURELY DISTRIBUTE LARGE DIGITAL VIDEO/DATA FILES WITH OPTIMUM SECURITY,".

BACKGROUND OF THE INVENTION

1. Field of the Invention.

The present invention relates generally to digital cinema systems, and in particular, to a method, system, apparatus, and article of manufacture for comparing actual digital cinema use information with contractual information.

2. Description of the Related Art.

The methods by which movies and other media programs that are distributed to theaters for display to audiences have not substantially changed in over 75 years. Theaters and distributors enter into contracts for displaying such movies. Such contracts may control how the movie is displayed, where the movie is displayed, and when the movie is displayed. Additionally, advertising contracts may be entered into for displaying advertisements prior to the movie. Similar to the movie contracts, the advertising contracts may also control how, what, where, and when the advertisement is displayed.

Once the contracts have been entered into, celluloid copies of such movies (and/or advertisements) are distributed to each theater in advance of the first showing. The same distributed copy is repeatedly displayed for audiences until the movie is excessively worn, the license expires, or the theater stops showing the movie in favor of a more popular movie.

There are several problems with this process. First, the process of manually and securely distributing physical celluloid copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. As will be described further herein, the present invention solves that need by providing for the distribution of digital copies of media programs via a satellite or other high bandwidth medium For example, digital cinema systems provide the ability for distributing digital copies of motion picture "films" electronically directly to theatres running exhibitor systems.

Whether movie content and advertisements are distributed digitally or via celluloid, information regarding use data for the movie/advertisements are then reported/communicated verbally to the content owner. Such use data includes when the movie content and advertisements were displayed, where they were displayed, how they were displayed, etc. However, there are many problems associated with the verbal reporting of use data. For movie content, such verbal reporting does not ensure that the content is not being viewed at times other than those scheduled by management. For advertisements, such verbal reporting does not ensure that the content is actually being shown the required number of times. Accordingly, the prior art fails to provide an efficient and accurate accounting for content and advertisements.

What is needed is a system and method for the distribution of digital media that enables theatres, content owners, and advertisers to track and utilize use data. The present invention satisfies these needs.

SUMMARY OF THE INVENTION

In the prior art, it is difficult to determine whether movie and advertisement exhibition contracts have been complied with. One or more embodiments of the invention use data generated during equipment monitoring to create counts of the number of times a particular movie or advertisement or set of slides has actually been shown. Further, the data is also used to generate a detailed report/summary on the date/times of showings. The data is then compared with the contract data and a report may be generated.

BRIEF DESCRIPTION OF THE DRAWINGS

Referring now to the drawings in which like reference numbers represent corresponding parts throughout:

FIGS. 1A and 1B depict a top-level functional block diagram of a media program distribution system in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention utilize data collected from theater projection equipment monitoring to compare with movie distribution and advertisement contract data.

Hardware Environment

Figure 1B:
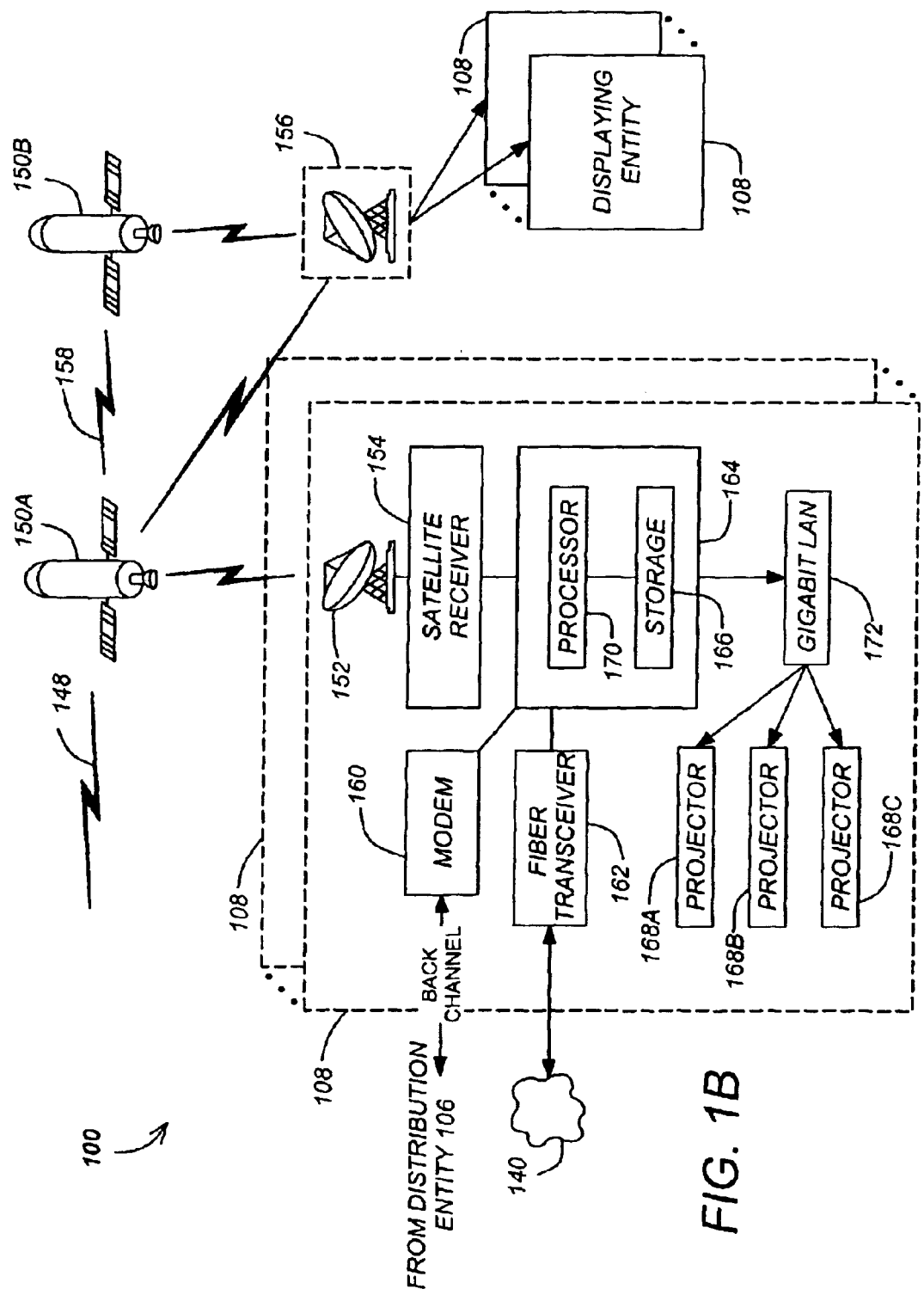

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities 108 (also referred to as exhibitors 108). The content provider 102 provides media content 110 such as audiovisual material to the protection entity 104. Such media content 110 may include movie content or advertisements. As used herein, the term "media content" includes any and all types of content including movie content and advertisements. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laserdisk, or similar medium). The output media content 128 can then be archived in a data vault facility 130 until it is needed.

When needed, the prepared output media content 128 is then provided to the distribution entity 106 (alternatively referred to hereinafter as the network operations center [NOC]). Although illustrated as separate entities, the protection entity 104 and the distribution entity 106 can be combined into a single entity, thus ameliorating some security concerns regarding the transmission of the output media content 128.

When providing the media content 128, contractual data 131 (i.e., data relating to the contractual requirements for displaying the media content 128 or for the exhibitor system 108) may also be provided to distribution entity 106. Such contractual data may be received from a distributor/owner of the media content 128 via a business operations system (BOS) 146 (also referred to as business operations management system (BOMS)). Further, such contractual data may include information regarding the number of media contents 128 to be displayed, media contents 128 show days and time, the total number of media content 128 showings per exhibitor, and/or the total number of days media content 128 is to be shown.

The distribution entity 106 includes a conditional access management system (CAMS) 132 (also referred to as a configuration management engine), that processes the output media content 128 and contractual data 131 stored in the database 144, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136 and uplink antenna 138.

Also, as shown, in addition or in the alternative to transmission via satellite, the media program can be provided to the displaying entity 108 via a forward channel fiber network 140. Additionally, information may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. billing, authorization, usage tracking, etc.), while the satellite network provides for transfer of the output media content 128 to the displaying entities 108. For example, the back channel may provide for the transmission of a monitoring and failure prevention message 143 from exhibitor system 108 to distribution entity 106. Such a message 143 may provide exhibition information to be used as part of a use and rights management system.

The output media content 128 may be securely stored in a database 144. Data is transferred to and from the database 144 under the control and management of distribution entity 106. Thus, the distribution entity 106 manages the transmission of information to displaying entity 108, and assures that unauthorized transmissions do not take place. Distribution entity 106 also contains an exhibitor support system/center (ESC) 147. The ESC 147 is responsible for summarizing the exhibitor system 108 exhibition information (i.e., the information received in message 143). ESC 147 may then compare the contractual data 131 received from the distributor/owner of the media content 128, which is part of a use and rights management system. An exhibition vs. contractual report 149 may then be generated, including any discrepancies. The report 149 may then be provided to the appropriate personnel (e.g., business operations 146).

Turning to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

A typical displaying entity 108 comprises a modem 160 (and may also include a fiber transceiver 162) for receiving and transmitting information through the back channel (i.e., via a communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. Such feedback information may consist of exhibition information developed from the projection system (i.e., from the content server 164 or from projectors 168A–C). For example, exhibition information may include media content 128 exhibition start time with a screen identification, an exhibitor identification, and/or media content 128 exhibition end time. As described above, the exhibition information may be transmitted across the back channel from display entity 108 to distribution entity 106 in a monitoring and failure prevention message 143.

Figure 2:
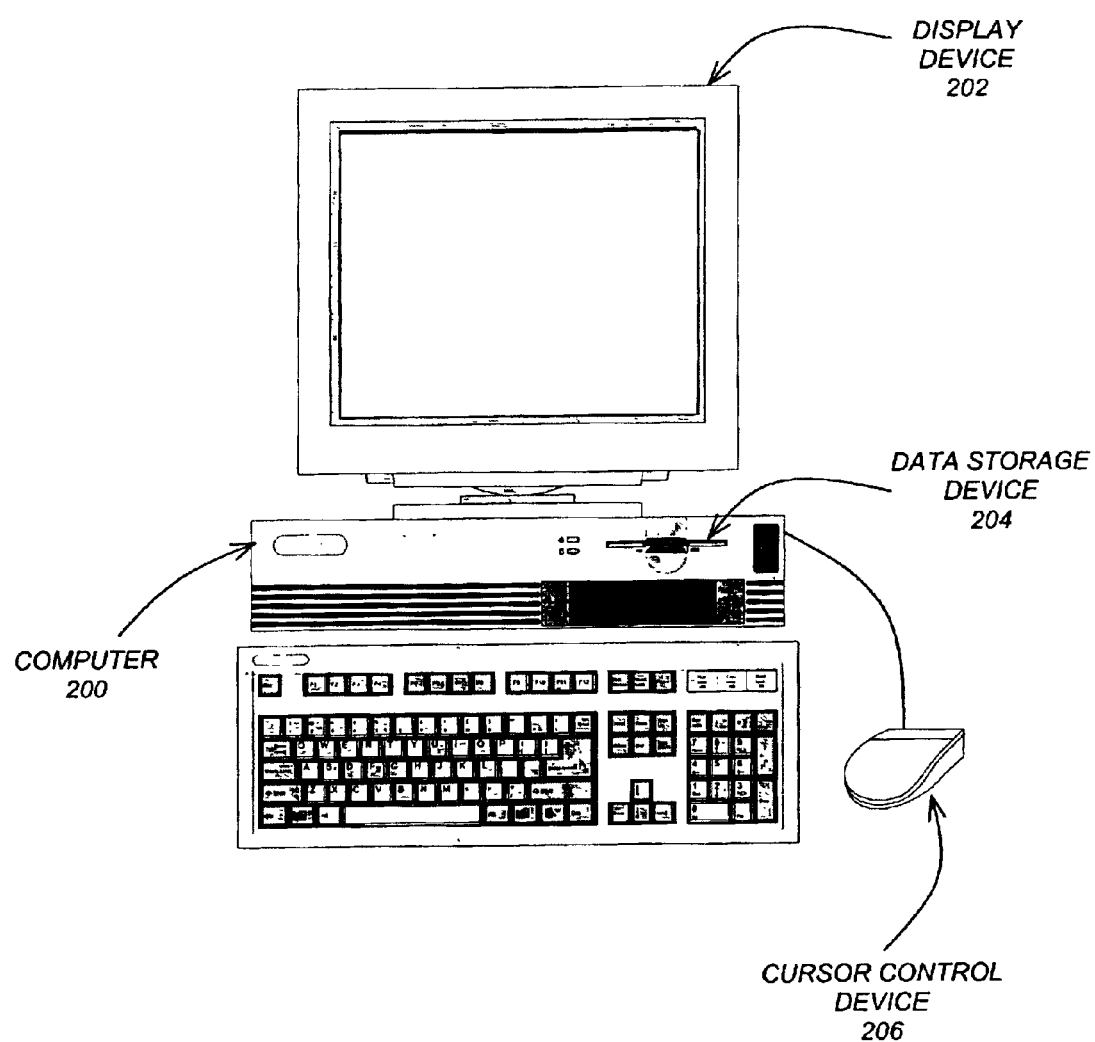
FIG. 2 is a functional block diagram of a computer system that can be used to perform the operations of the media preparation processor and processing system in accordance with one or more embodiments of the invention.

The output media content 128 and other information may be accepted into a processing system 164 (also referred to as a content server) such as a server or computer similar to that which is illustrated in FIG. 2 (see description below). The output media content 128 may then be stored in the storage device 166 for later transmission to displaying systems (e.g., digital projectors) 168A–168C. Before storage, the output media content 128 can be decrypted to remove transmission encryption (e.g. any encryption applied by the CAMS 132), leaving the encryption applied by the preparation server 116.

When the media content 110 is to be displayed, final decryption techniques are used on the output media content 128 to substantially reproduce the original media content 110 in a viewable form which is provided to one or more of the displaying systems 168A–168C. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A–168C over an independently encrypted connection, such as on a gigabit LAN 172.

FIG. 2 is a functional block diagram of a computer system 200 that can be used to perform the operations of the media preparation processor 116 and processing system 164. Embodiments of the invention are typically implemented using a computer 200, which generally includes, inter aha, a display device 202, data storage devices 204, cursor control devices 206, and other devices. Those skilled in the art will recognize that any combination of the above components, or any number of different components, peripherals, and other devices, may be used with the computer 200.

Programs executing on the computer 200 (such as an operating system) are comprised of instructions which, when read and executed by the computer 200, causes the computer 200 to perform the steps necessary to implement and/or use the present invention. Computer programs and/or operating instructions may also be tangibly embodied in a memory and/or data communications devices of the computer, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Comparison Logic

Figure 3:
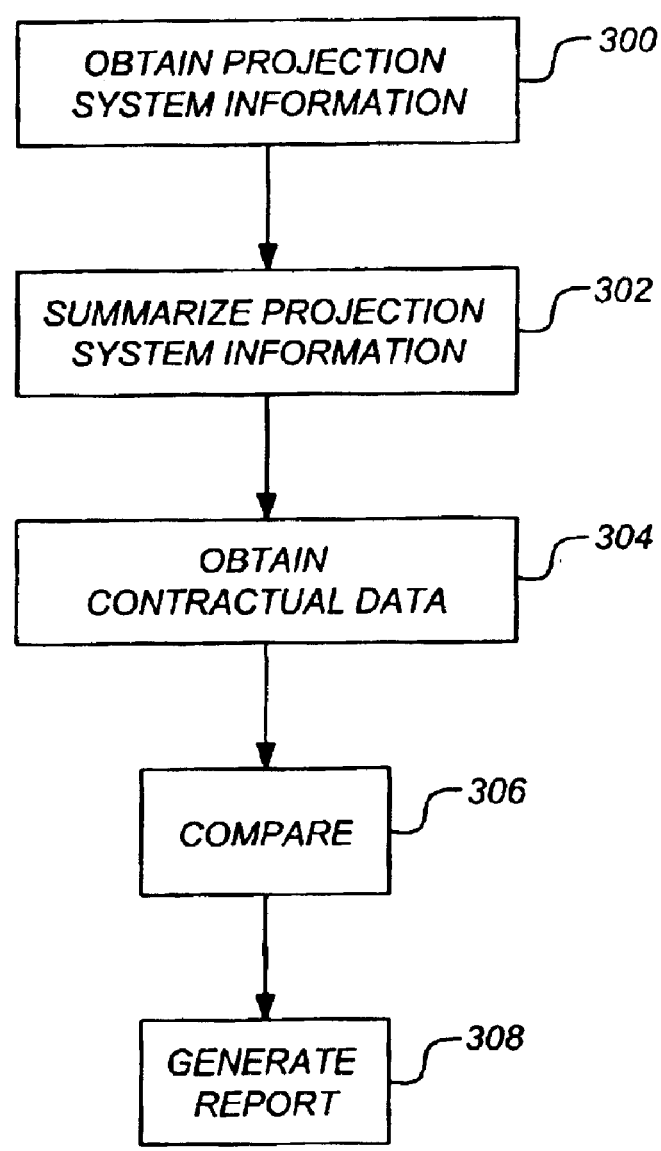
FIG. 3 is a flow chart illustrating the logic for conducting a comparison in accordance with one or more embodiments of the invention.

As described above, data collected from theater projection equipment (i.e., projectors 168 or processing system 164) monitoring is used and compared with movie distribution and advertisement contract data. FIG. 3 is a flow chart illustrating the logic for conducting a comparison in accordance with one or more embodiments of the invention. At step 300, the projection system (i.e., projectors 168A–C, gigabit LAN 172, content server 164, or other components within display entity 108) monitors the exhibition to obtain a set of exhibition information. Such exhibition information may include media content 128 exhibition start time with a screen identification, an exhibitor identification, and/or a media content 128 exhibition end time. The exhibition information may then be obtained by the distribution entity 106 (specifically, the exhibitor support system 147 within the distribution entity 106) as part of the monitoring and failure prevention message 143.

At step 302, the exhibitor support system 147 summarizes the exhibition information. The summarization provides the ability to develop various types of useful information. For example, the following exhibition information may be developed:

Number of content/advertisement showings per screen;

Content/advertisement show days and time by screen;

Total number of content/advertisement showings per exhibitor;

Total number of days content/advertisement was shown at exhibitor; and

Content/advertisement that did not complete the showing and the percentage of completion.

At step 304, contractual data that consists of contractual requirements for the exhibitor system 108 is obtained (e.g., from the distributor/owner of the content/advertisement). Such contractual data may be part of a use and rights management system for media content 128. At step 306, the summarized exhibition information (or raw exhibition information) is compared with the contractual data to produce comparison information. The comparison information (including any discrepancies) may then be placed in an appropriate form. For example, a report of the comparison may be generated at step 308.

The comparison information may be displayed by the distribution entity 106, forwarded to an appropriate person (e.g., a business operation), or utilized in a desirable manner. For example, content owners and advertisers can ensure that exhibition contracts have been followed, or if not, the discrepancies are documented and reported.

Thus, based on the comparison, distributors, content owners and advertisers can validate proper use of their content and ensure the collection of revenues due for advertising by collecting exact counts on advertisement showings. Exhibitors can also monitor the use of movie showings and ensure that only approved showings are taking place.

In addition to the above, exhibition information (and/or the summary of the exhibition information) and/or the comparison information may be aggregated for further use. For example, aggregated data may be sold to theater circuits and advertising agencies to view historical market penetration data for the planning of future sales. However, if such information is aggregated and/or sold, customers (e.g., viewers, exhibitors, theater owners, etc.) may need to grant permission for the collection and use of the data.

Conclusion

This concludes the description of the preferred embodiment of the invention.

The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Additionally, the automated tracking and comparison of exhibition information may be used in a variety of other applications (e.g., satellite broadcast or cable viewing information collected in a set top box). In summary, the invention provides for the use of an equipment monitoring system to collect specific information on what is being exhibited and data related to the exhibition to use to compare with contractual requirements.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for monitoring an exhibition system in a digital cinema system, comprising:

receiving, in a distribution system of a digital cinema system, exhibition information from an exhibitor system in the digital cinema system, wherein the exhibition information is automatically generated during a monitoring of projection system equipment;

summarizing, in the distribution system, the exhibition information, wherein the summary comprises computed totals, on a per screen basis and a per exhibitor basis, of exhibition of advertisements and content by the projection system equipment;

receiving, in the distribution system, contractual data comprising contractual requirements for the exhibitor system; and comparing the contractual data with the summary to produce comparison information.

2. The method of claim 1, wherein the exhibition information comprises a content exhibition start time with a screen identification, an exhibitor identification, and a content exhibition end time.

3. The method of claim 1, wherein the summary comprises content or advertisement show days and time by screen.

4. The method of claim 1, wherein the summary comprises a total number of days a content or advertisement was shown at the exhibitor system.

5. The method of claim 1, wherein the summary comprises a notice regarding a content or advertisement that did not complete a showing and a percentage of completion.

6. The method of claim 1, further comprising:

aggregating the summary for multiple exhibitor systems; and providing the aggregation to a third party.

7. The method of claim 1, wherein the contractual data is received from a distributor or owner of a content or advertisement.

8. The method of claim 1, wherein the comparison information comprises a report.

9. The method of claim 1, further comprising validating proper use of content and use by an exhibitor based on the comparison information.

10. The method of claim 1, wherein there are two or more screens for each exhibitor.

11. A system for monitoring an exhibition system in a digital cinema system, comprising:

(a) exhibition information of an exhibitor system in a digital cinema system, wherein the exhibition information is automatically generated during monitoring of projection system equipment;

(b) an exhibitor support computer having a memory, wherein the exhibitor support computer is part of a distribution system of the digital cinema system, wherein the exhibitor support computer is configured to:

(i) receive the exhibition information from the exhibitor system;

(ii) summarize the exhibition information, wherein the summary comprises computed totals, on a per screen basis and a per exhibitor basis, of exhibition of advertisements and content by the projection system equipment;

(iii) receive contractual data comprising contractual requirements for the exhibitor system; and (iv) compare the contractual data with the summary to produce comparison information.

12. The system of claim 11, wherein the exhibition information comprises a content exhibition start time with a screen identification, an exhibitor identification, and a content exhibition end time.

13. The system of claim 11, wherein the summary comprises content or advertisement show days and time by screen.

14. The system of claim 11, wherein the summary comprises a total number of days a content or advertisement was shown at the exhibitor system.

15. The system of claim 11, wherein the summary comprises a notice regarding a content or advertisement that did not complete a showing and a percentage of completion.

16. The system of claim 11, wherein the computer is further configured to:

aggregate the summary for multiple exhibitor systems; and provide the aggregation to a third party.

17. The system of claim 11, wherein the contractual data is received from a distributor or owner of a content or advertisement.

18. The system of claim 11, wherein the comparison information comprises a report.

19. The system of claim 11, wherein the computer is further configured to validate proper use of content and use by an exhibitor based on the comparison information.

20. The system of claim 11, wherein there are two or more screens for each exhibitor.

* * * * *